US012775995B2

(12) United States Patent
Langtind et al.

(10) Patent No.: US 12,775,995 B2
(45) Date of Patent: Oct. 27, 2026

(54) GRAPHICS PROCESSING

(71) Applicant: Arm Limited, Cambridge (GB)

(72) Inventors: Frank Klaeboe Langtind, Melhus (NO); Philip Carlos Garcia, Austin, TX (US); Naveen Kumar Singh, Cambridge (GB)

(73) Assignee: Arm Limited, Cambridge (GB)

( * ) Notice: Subject to any disclaimer, the term of this patent is extended or adjusted under 35 U.S.C. 154(b) by 113 days.

(21) Appl. No.: 18/914,719

(22) Filed: Oct. 14, 2024

(65) Prior Publication Data

US 2026/0105563 A1 Apr. 16, 2026

(51) Int. Cl.
*G06T 1/20* (2006.01)
*G06T 1/60* (2006.01)

(52) U.S. Cl.
CPC .................. *G06T 1/20* (2013.01); *G06T 1/60* (2013.01)

(58) Field of Classification Search
CPC .................................... G06T 1/20; G06T 1/60
See application file for complete search history.

(56) References Cited

U.S. PATENT DOCUMENTS 7,170,513 B1 * 1/2007 Voorhies ............... G06T 15/405 345/428
7,385,608 B1 * 6/2008 Baldwin ................. G06T 15/04 345/589
7,446,773 B1 * 11/2008 Alben ................... G06F 9/4893 345/506
7,461,210 B1 * 12/2008 Wentzlaff .............. G06F 12/126 711/120
7,505,036 B1 * 3/2009 Baldwin ............... G06T 15/503 345/419
7,564,456 B1 * 7/2009 Lindholm ............. G06T 15/005 345/426
9,098,943 B1 * 8/2015 Baldwin ................... G06T 1/20
9,672,225 B2 * 6/2017 Otala ..................... G06F 16/583
10,437,637 B1 * 10/2019 Koneru ...................... G06F 8/44
2003/0210248 A1 * 11/2003 Wyatt ................. G06F 12/0888 345/557
2005/0027940 A1 * 2/2005 Zimmer .............. G06F 12/0802 711/E12.017
2007/0165035 A1 * 7/2007 Duluk, Jr. ............... G06T 15/20 345/506
2009/0240895 A1 * 9/2009 Nyland ................. G06F 9/3888 711/149

(Continued)

OTHER PUBLICATIONS

Kang, S., & Reddy, A. N. (2006). An approach to virtual allocation in storage systems. ACM Transactions on Storage (TOS), 2(4), 371-399.*

*Primary Examiner* — Sarah Lhymn
(74) *Attorney, Agent, or Firm* — Pearl Cohen LLP

(57) ABSTRACT

A graphics processor is disclosed. A packet processing unit of the graphics processor processes an input packet of primitives by subjecting the input packet to one or more processing operations, and storing data produced by the one or more processing operations in local storage. The packet processing unit stores a corresponding output packet of primitives in memory by allocating an amount of memory space for storing the output packet based on an amount of data produced by the one or more processing operations stored in the local storage, and storing the output packet in the allocated memory space.

15 Claims, 9 Drawing Sheets

(56) References Cited

U.S. PATENT DOCUMENTS

| | | | | |
|---|---|---|---|---|
| 2010/0115202 | A1* | 5/2010 | Zimmer | G06F 12/126 711/E12.017 |
| 2012/0133654 | A1* | 5/2012 | Redgrave | G06F 9/4881 345/522 |
| 2012/0139926 | A1* | 6/2012 | Clohset | G06F 9/5016 345/502 |
| 2014/0118365 | A1* | 5/2014 | Hakura | G06T 15/005 345/506 |
| 2014/0237187 | A1* | 8/2014 | Dimitrov | G06F 12/0897 711/122 |
| 2015/0312162 | A1* | 10/2015 | Raisch | H04L 47/62 370/412 |
| 2018/0095883 | A1* | 4/2018 | Polishuk | G06F 12/126 |
| 2018/0267898 | A1* | 9/2018 | Henry | G06F 12/082 |
| 2018/0293698 | A1* | 10/2018 | Venkatesh | G06T 1/20 |
| 2019/0096027 | A1* | 3/2019 | Fielding | G06F 12/0811 |
| 2019/0139294 | A1* | 5/2019 | Redshaw | G06T 11/40 |
| 2019/0235917 | A1* | 8/2019 | Koneru | G06F 9/4843 |
| 2020/0043123 | A1* | 2/2020 | Dash | G06F 9/3851 |
| 2020/0218471 | A1* | 7/2020 | Chen | G06F 3/0659 |
| 2020/0249957 | A1* | 8/2020 | Qin | G06F 9/4405 |
| 2021/0216455 | A1* | 7/2021 | Uhrenholt | G06F 9/30196 |
| 2021/0287429 | A1* | 9/2021 | Vaidyanathan | G06T 15/06 |
| 2021/0295584 | A1* | 9/2021 | Engh-Halstvedt | G06T 1/20 |
| 2021/0365429 | A1* | 11/2021 | Gupta | G06F 16/2343 |
| 2021/0406177 | A1* | 12/2021 | Patel | G06F 12/0888 |
| 2022/0027281 | A1* | 1/2022 | Uhrenholt | H04N 19/426 |
| 2022/0027283 | A1* | 1/2022 | Uhrenholt | G06F 12/0895 |
| 2022/0215775 | A1* | 7/2022 | Kosstrin-Greenberg | G09B 7/08 |
| 2022/0365882 | A1* | 11/2022 | Edwards | G06F 12/127 |
| 2024/0005602 | A1* | 1/2024 | Kallio | G06T 9/001 |
| 2024/0126458 | A1* | 4/2024 | Ghiggini | G06F 12/0897 |
| 2025/0138883 | A1* | 5/2025 | Stabrawa | G06F 9/5044 |
| 2025/0370930 | A1* | 12/2025 | Musoll | G06F 12/0802 |

* cited by examiner

84

| Index | LSC Reserved for packets | Address |
|---|---|---|
| 1 | Packet header | 0x100000 |
| 2 | Compressed primitive information | 0x100100 |
| 3 | Compressed primitive information | 0x100200 |
| 4 | | |
| 5 | | |
| 6 | | |
| 7 | | |
| 8 | | |
| 9 | | |
| 10 | Vertex data | 0x100300 |
| 11 | Vertex data | 0x100400 |
| 12 | Vertex data | 0x100500 |
| 13 | Vertex data | 0x100600 |
| 14 | Vertex data | 0x100700 |
| 15 | Vertex data | 0x100800 |
| 16 | | |
| 17 | | |
| 18 | | |
| 19 | | |

FIG. 7B

GRAPHICS PROCESSING

BACKGROUND

The technology described herein relates to computer graphics processing, such as tile-based graphics processing.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles, quadrilaterals, points, lines, or groups thereof.

Each primitive is usually defined by and represented as a set of vertices (e.g. three vertices in the case of triangular primitive). Typically, the set of vertices to be used for a given graphics processing output (e.g. frame for display) will be stored as a set of vertex data defining the vertices, e.g. the relevant attributes for each of the vertices. These attributes will typically include position data and other, non-position data, e.g. defining colour, light, normal, texture coordinates, etc, for the vertex in question. This geometry (vertex) data is processed by a graphics processor to generate the desired graphics processing output (render target), such as a frame for display.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". The render output is typically divided (by area) into regularly-sized and shaped rendering tiles (they are usually e.g., squares or rectangles). The tiles are each rendered separately (e.g., one after another). The rendered tiles are then combined to provide the complete render output (e.g. frame for display).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.

Tile-based graphics processing typically comprises an initial, geometry ("tiling") processing pass in which primitives assembled from geometry (vertex) data are processed to generate data structures that indicate which primitives should be processed for which rendering tiles. In a subsequent "fragment processing" pass, the rendering tiles are each rendered separately, with the data structures generated in the geometry processing pass being used to determine which primitives to process (e.g. rasterise and render) for which rendering tiles.

United Kingdom Patent Application No. 2316170.6 describes a tile-based graphics processing arrangement in which the initial geometry processing pass involves generating and processing packets of primitives to build a hierarchy of bounding boxes representative of positions of the primitives, and the subsequent fragment processing pass involves traversing the hierarchy of bounding boxes to identify which primitives to process (e.g. rasterise and render) for which rendering tiles.

The inventors believe there remains scope for improvements to graphics processing.

BRIEF DESCRIPTION OF THE DRAWINGS

Embodiments of the technology described herein will now be described by way of example only and with reference to the accompanying drawings, in which:

FIG. 7A, FIG. 7B and FIG. 7C show schematically operation of a load/store cache of the graphics processor of FIG. 3 in accordance with embodiments of the technology described herein.

DETAILED DESCRIPTION

Figure 1:
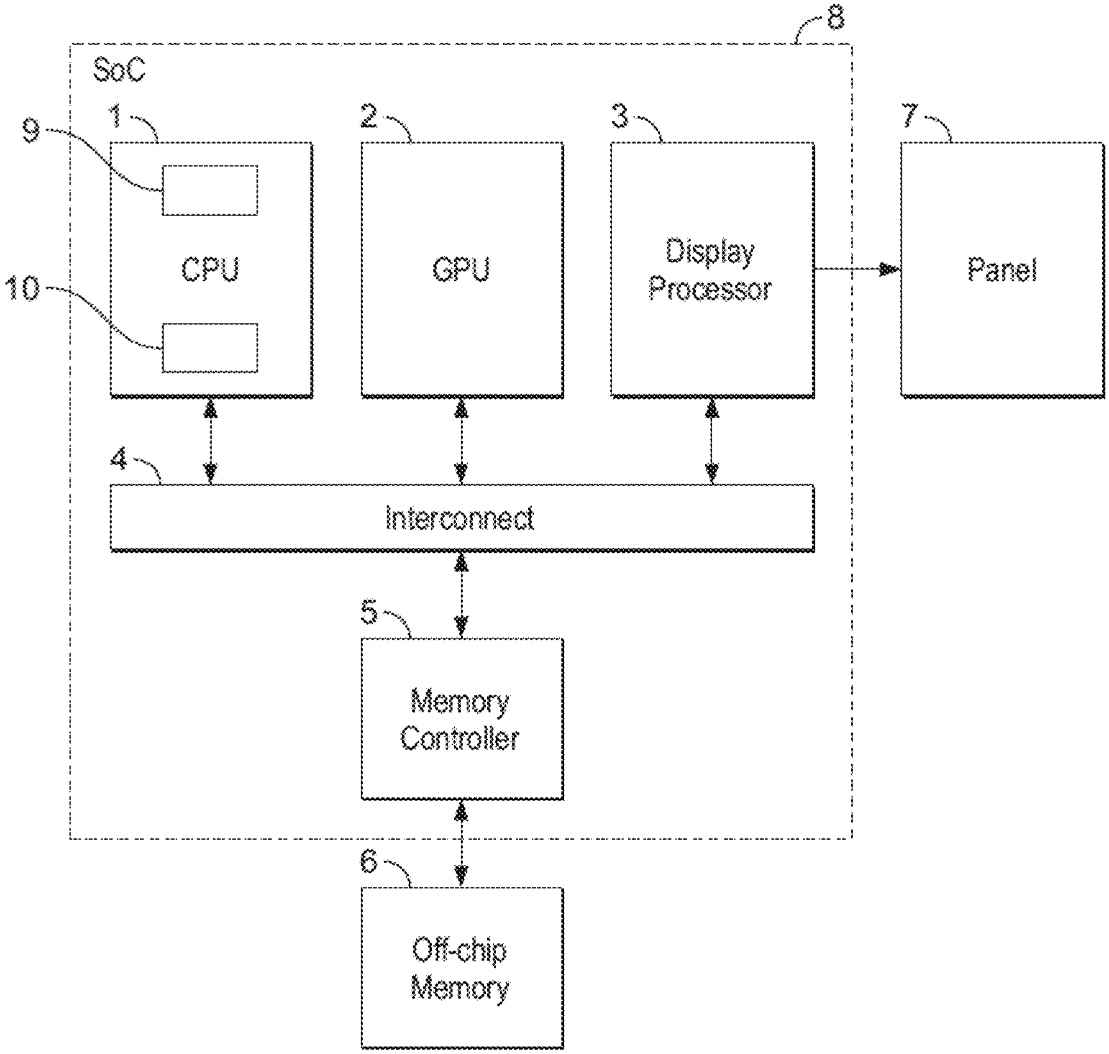
FIG. 1 shows an exemplary data processing system in which the technology described herein may be implemented.

A first embodiment of the technology described herein comprises a method of operating a graphics processor that comprises:

local storage; and one or more packet processing units operable to process input packets of primitives to generate output packets of primitives, and store output packets of primitives in memory;

the method comprising a packet processing unit of the one or more packet processing units:

processing an input packet to generate an output packet; and storing the output packet in memory;

wherein processing the input packet to generate the output packet comprises:

- subjecting the input packet to one or more processing operations; and
- storing data produced by the one or more processing operations in the local storage; and wherein storing the output packet in memory comprises:

- allocating an amount of memory space for storing the output packet based on an amount of data produced by the one or more processing operations stored in the local storage; and
- storing the output packet in the allocated memory space.

A second embodiment of the technology described herein comprises a graphics processor that comprises:

local storage; and one or more packet processing units operable to process input packets of primitives to generate output packets of primitives, and store output packets of primitives in memory;

wherein a (each) packet processing unit of the one or more packet processing units is configured to process an input packet to generate an output packet by:

- subjecting the input packet to one or more processing operations; and
- storing data produced by the one or more processing operations in the local storage; and wherein the packet processing unit is configured to store an output packet in memory by:

allocating an amount of memory space for storing the output packet based on an amount of data produced by the one or more processing operations stored in the local storage; and storing the output packet in the allocated memory space.

The technology described herein relates to a graphics processor (GPU) that has one or more packet processing units that are operable to process input packets ("geometry packets") of primitives and store output, processed packets ("primitive (polygon) packets") of primitives in memory, e.g. external memory (i.e. memory that is on a different chip to the graphics processor).

The one or more packet processing units process an (each) input packet of one or more primitives by performing one or more processing operations on (the primitives of) the input packet. In embodiments, the one or more processing operations include (at least) a culling operation and/or a compression operation, e.g. and in embodiments, such that a size of the corresponding output packet of one or more primitives is variable, and will depend on the results of the one or more processing operations. For example, the size of an output packet may vary depending on a number of primitives that survive the culling operation and/or compressibility of packet data.

In the technology described herein, (at least some) data produced by a packet processing unit subjecting an input packet to the one or more processing operations (e.g. the culling and/or compression operation) is stored (temporarily) in local storage (i.e. in storage that is on the same chip as the graphics processor/packet processing unit), before the corresponding output packet is stored in (e.g. written out to) memory. Memory space allocation for storing the output packet in memory is then based on the (actual) amount of data that has been (temporarily) stored in the local storage as a result of subjecting the input packet to the one or more processing operations (e.g. the culling and/or compression operation).

As will be discussed in more detail below, taking into account the results of input packet processing (e.g. culling and/or compression) when allocating memory space for storing a corresponding output packet in this manner can improve memory efficiency, e.g. as compared to arrangements that allocate memory space for storing output packets regardless of the results of input packet processing (e.g. culling and/or compression).

It will be appreciated therefore, that the technology described herein can provide improved graphics processing.

As will be discussed in more detail below, the local storage is in embodiments operable as a "scratchpad" for temporarily storing output data as it is being produced. In embodiments, only once the processing of an input packet by a packet processing unit is completed, and all of the data produced by the one or more processing operations (e.g. the culling and/or compression operation) for the packet that is to be stored in the local storage (scratchpad) is stored in the local storage (scratchpad), is memory space allocated for storing the corresponding output packet.

The graphics processor (GPU) should be, and in embodiments is, operable to generate a render output. A render output may comprise any suitable render output, such as frame for display, or render to texture output, etc. A render output will typically comprise an array of data elements (sampling points) (e.g. pixels), for each of which appropriate render output data (e.g. a set of colour value data) is generated by the graphics processor. A render output data may comprise colour data, for example, a set of red, green and blue, RGB values and a transparency (alpha, a) value. Where the graphics processor generates plural (e.g. a series of) render outputs, each render output may be generated in accordance with the technology described herein.

The graphics processor (GPU) may be a tile-based graphics processor. The graphics processor may thus generate an overall render output on a tile-by-tile basis, with the render output (area) being divided into plural rendering tiles for rendering purposes.

The tiles that the render output is divided into for rendering purposes can be any suitable and desired such tiles. The size and shape of the rendering tiles may normally be dictated by the tile configuration that the graphics processor is configured to use and handle.

The rendering tiles are in embodiments all the same size and shape (i.e. regularly-sized and shaped tiles are in embodiments used), although this is not essential. The tiles are in embodiments rectangular, and in embodiments square. The size and number of tiles can be selected as desired. In embodiments, each tile is 16×16, 32×32, or 64×64 data elements (sampling positions) in size (with the render output then being divided into however many such tiles as are required for the render output size and shape that is being used).

In embodiments, the tile-based graphics processor performs a first (geometry, e.g. tiling) processing pass and a second (e.g. fragment) processing pass in order to generate a (the) render output (e.g. frame for display). In embodiments, the first processing pass prepares primitive information (data) for a set of primitives that is used in the second processing pass to determine which primitives of the set to process (e.g. rasterise and render) for which rendering tiles that the render output is divided into.

The graphics processor (GPU) may be part of a graphics processing system that may further comprise a host processor, e.g. a central processing unit (CPU). The host processor (e.g. CPU) may execute applications that can require graphics processing by the graphics processor (GPU), and send appropriate commands and data to the graphics processor (GPU) to control it to perform graphics processing operations and to produce graphics processing (render) output required by applications executing on the host processor (CPU).

To facilitate this, the host processor (CPU) may also execute a driver for the graphics processor (GPU). The graphics processor may comprise a control unit that is operable to receive commands and data from (the driver executing on) the host processor (e.g. CPU), and control the graphics processor accordingly.

The graphics processor (GPU) may comprise one or more, e.g. plural, processing cores. A (each) processing core may be (a shader core) operable to perform graphics processing operations by executing (e.g. shader) program instructions (e.g. under the control of the control unit). There may be any suitable number of processing cores, such as 1, 2, 4, 8, 16, 32 or another number. In embodiments, a (each) processing core comprises one or more execution units (execution engines) that are operable to execute program instructions.

The graphics processor comprises one or more, e.g. plural, packet processing units that process input packets of primitives (e.g. under the control of the control unit). In embodiments, a (each) processing core of the one or more processing cores is associated with, e.g. comprises, a (respective) packet processing unit of the one or more packet processing units. Thus, in embodiments, the graphics processor comprises as many packet processing units as processing cores.

The graphics processor should comprise, and/or be in communication with, a memory. The memory may, for example, be a main memory of the overall graphics processing system that the graphics processor is part of. In embodiments, it is a memory that is off chip from the graphics processor, i.e. an external (main) memory (external to the processor).

The graphics processor may be in direct communication with the memory, or may communicate with the memory via a cache system. Thus, in embodiments, the graphics processor comprises a cache system that is operable to cache data stored in the memory for the graphics processor.

The cache system may be a single level cache system, or a multi-level cache system. In embodiments, the cache system of the graphics processor comprises one or more, e.g. plural, lower-level (e.g. L1) caches and a higher-level (e.g. L2) cache. A (the) higher-level (e.g. L2) cache may be in communication with the memory and each of the one or more, e.g. plural, lower-level (e.g. L1) caches. A (each) lower-level (e.g. L1) cache may be in communication with the higher-level (e.g. L2) cache and a (respective) processing core of the one or more, e.g. plural, processing cores. Thus, in embodiments, the graphics processor comprises as many lower-level (e.g. L1) caches as processing cores. The cache system may comprise one or more further cache levels, such as a level 0 (L0) and/or level 3 (L3) cache.

A (each) cache of the cache system should, and in embodiments does, comprise a respective set of cache entries, such as and in embodiments, a respective set of cache lines. Each cache entry (e.g. cache line) in the cache system in embodiments has the same (fixed) size, such as 16 bytes, 32 bytes, 64 bytes, 128 bytes, 256 bytes, etc. A (each) cache entry (e.g. cache line) should, and in embodiments does, include respective data that the cache entry caches, and in embodiments an identifier (e.g. tag) for the data, that in embodiments indicates a location (address) in the memory where corresponding data is stored. A (each) cache entry (e.g. cache line) in embodiments further comprises state information indicating a status of the cache entry, such as, and in embodiments, whether the respective data is valid or invalid, and/or whether or not the respective data is "dirty", and/or whether or not the respective data is cached by another cache of the cache system (i.e. whether the data is "shared" or "unique"), etc.

The graphics processor (GPU) may (further) comprise a geometry processing unit that is operable (e.g. under the control of the control unit) to generate the input packets of primitives ("geometry packets") that the one or more packet processing units process.

A (each) packet may store primitive data and vertex data for the one or more primitives of the (respective) packet. For example, a packet may store appropriate attributes, such as positions and non-position attributes, for a set of vertices for the primitives that the packet relates to. A packet may (further) store a set of identifiers (indices) for the vertices that can be used to determine how the vertices are used for the primitives that the packet relates to. A packet may (also) store attributes and identifiers for the primitives, and/or other, e.g., state, information relating to the primitives that the packet relates to. Other arrangements would be possible.

In embodiments, the geometry processing unit generates input packets by assembling primitives from geometry data (e.g. provided by (the driver executing on) the host processor (e.g. CPU)) and assigning primitives to packets in order (e.g. in which they are defined for processing). In embodiments, a packet has a fixed capacity, e.g. an upper limit of vertices and/or primitives, and when the fixed capacity is reached, a new packet is started. There may be an upper limit of vertices of, for example, 64, 128 or 256 vertices, and/or an upper limit of primitives of, for example, 64, 128 or 256 primitives. Other numbers would be possible.

The geometry processing unit may also perform or trigger geometry transformation operations for the primitives/vertices in a packet, such as position shading, non-position shading, etc. In embodiments, once geometry transformation operations for a packet are completed, the packet is assigned to a packet processing unit of the one or more packet processing units for processing, and is processed by the assigned packet processing unit.

A (each) packet processing unit is operable to process an input packet of one or more primitives (a "geometry packet") (generated by the geometry processing unit) to generate a corresponding output packet of one or more primitives (a "primitive packet"). A (each) packet processing unit processes an input packet by subjecting (primitives of) the input packet to one or more processing operations.

At least one of the one or more processing operations is in embodiments such that a size of an output packet of one or more primitives produced by subjecting (primitives of) an input packet of one or more primitives to the at least one processing operation is variable, and will depend on the results of the at least one processing operation. For example, the one or more processing operations may comprise a culling operation and/or a compression operation.

The culling operation may cull primitives of the input packet from further processing, such that the corresponding output packet only comprises primitives that have survived the culling operation and does not include any culled primitives. Where all primitives of an input packet are culled by the culling operation, a corresponding output packet may not be generated. The culling operation may comprise, for example, front/back-face culling, frustum culling, and/or sample aware culling, etc.

The compression operation may compress data of the input packet (e.g. primitive and/or vertex data) to generate compressed data (e.g. primitive and/or vertex data) that is stored in the corresponding output packet. Any suitable form of data compression may be used.

A (each) packet processing unit may subject an input packet to one or more further processing operations. In embodiments, the graphics processor is a tile-based graphics processor, and a (each) packet processing unit is operable to generate primitive information (data) for an input packet that can be (and in embodiments is) used to determine which primitives of the packet (that survive the culling operation) should be processed (e.g. rasterised and rendered) for which rendering tiles that the render output is divided into.

The primitive information generated by a packet processing unit may comprise lists of primitives to process for different primitive listing regions of the render output. In embodiments, the primitive information represents (in embodiments, a hierarchy of) bounding boxes that are representative of positions of primitives to be processed. For example, a hierarchy of bounding boxes may be generated substantially as described in United Kingdom Patent Application No. 2316170.6, the entire contents of which is hereby incorporated herein by reference.

The graphics processor comprises local storage that a packet processing unit uses to (temporarily) store data produced by subjecting an input packet to its processing (e.g. comprising at least the culling and/or compression operation). In embodiments, the local storage is operable as a "scratchpad" for temporarily storing output data as it is being produced by a packet processing unit. The output data may comprise output packet data, such as primitive data and vertex data, e.g. as described above.

The local storage (e.g. scratchpad) that is used to (temporarily) store data produced by a packet processing unit can be any suitable storage that is local to (on the same chip as) the graphics processor/packet processing unit.

The local storage (e.g. scratchpad) could be dedicated storage, i.e. storage that is only used to store data produced by a packet processing unit. However, in embodiments, the storage can be, and in embodiments is, used to store other data as well. For example, and in embodiments, the local storage is a cache of the cache system. In this regard, the inventors have recognised that using an existing cache as a "scratchpad" for (temporarily) storing data produced by a packet processing unit can reduce silicon (area) requirements, e.g. as compared to providing additional dedicated storage.

In embodiments, the local storage is a lower-level (e.g. L1) cache of the cache system. In embodiments, the local storage is the lower-level (e.g. L1) cache of the cache system that is in communication with the processing core that comprises the packet processing unit that produced the data.

Thus, in embodiments, the graphics processor comprises one or more processing cores, wherein each processing core is associated with, e.g. comprises, a respective local (e.g. L1) cache and packet processing unit. In embodiments, the local (e.g. L1) cache associated with a (and in embodiments each) processing core is operable as a scratchpad for (temporarily) storing data produced by the (respective) packet processing unit that is associated with the (same) processing core.

Data produced by a packet processing unit could be (temporarily) stored in a cache in the normal manner for the cache in question. However, the inventors have recognised that normal cache operation typically includes data in the cache being evicted to (main) memory to make room for new data, e.g. in accordance with the cache replacement policy in operation. In embodiments, to avoid unintentional eviction of data stored in a cache e.g. following the normal cache replacement policy, the cache can operate in at least two modes of operation: a first, normal mode of operation in which data stored in the cache can be evicted to memory (following the normal cache replacement policy), and a second mode of operation in which data stored in the cache cannot be evicted to memory (following the normal cache replacement policy). In embodiments, data produced by a packet processing unit is (temporarily) stored in the cache when operating in the second mode of operation.

Thus, in embodiments, the local storage is selectively configurable to operate either as (e.g. L1) cache or as a scratchpad, and the local storage is configured to operate as a scratchpad when (temporarily) storing data produced by a packet processing unit, and e.g. to otherwise operate as (e.g. L1) cache.

The entirety of a (e.g. L1) cache could be configured or configurable to operate as a scratchpad. However, in embodiments, only a region of a (e.g. L1) cache is configured or configurable to operate as a scratchpad, with the remainder of the cache operating as normal cache.

Thus, in embodiments, the local storage is a (e.g. L1) cache that comprises (at least) a region that is selectively configurable to operate either as cache or as a scratchpad, and the (at least a) region (temporarily) stores data produced by a packet processing unit when configured to operate as a scratchpad, and e.g. is otherwise configured to operate as (e.g. L1) cache.

It is believed that the idea of a cache having at least a region that can be selectively configured to operate as cache or as a scratchpad in this manner may be novel and inventive in its own right.

Thus, another embodiment of the technology described herein comprises a method of operating a graphics processor that comprises a cache system comprising a cache that comprises at least a region that is selectively configurable to operate in a first (cache) mode of operation in which data stored in the at least a region can be evicted to memory and a second (scratchpad) mode of operation in which data stored in the at least a region cannot be evicted to memory;

the method comprising:

configuring the at least a region of the cache to operate in the second (scratchpad) mode of operation; and storing data produced by the graphics processor in the at least a region of the cache.

Another embodiment of the technology described herein comprises a graphics processor comprising:

a cache system comprising a cache that comprises at least a region that is selectively configurable to operate in a first (cache) mode of operation in which data stored in the at least a region can be evicted to memory and a second (scratchpad) mode of operation in which data stored in the at least a region cannot be evicted to memory; and a control circuit configured to configure the at least a region of the cache to operate in the first (cache) mode of operation or in the second (scratchpad) mode of operation.

These embodiments can, and in embodiments do, include any one or more or all of the optional features described herein, as appropriate.

The region of a cache that is configured or configurable to operable as a scratchpad can be any suitable size. In embodiments, the region is (e.g. only just) large enough (e.g. comprises sufficient cache entries) to store a maximum possible amount of data that can be produced by a packet processing unit subjecting an input packet to the one or more processing operations (e.g. including the culling and/or compression operation). For example, the region may be sized (e.g. comprise sufficient cache entries) to store output data produced when the culling operation does not result in any culling and/or when the compression operation does not result in any data size reduction.

In embodiments, the data produced by the one or more processing operations comprises primitive data and vertex data (e.g. as described above), and the region of the cache comprises a first set of one or more cache entries for storing primitive data, and a second set of one or more cache entries for storing vertex data. In embodiments, the first set of one or more cache entries comprises as many cache entries (e.g. cache lines) as are required to store a maximum possible amount of primitive data that can be produced by a packet processing unit subjecting an input packet to the one or more processing operations. In embodiments, the second set of one or more cache entries comprises as many cache entries (e.g. cache lines) as are required to store a maximum possible amount of vertex data that can be produced by a packet processing unit subjecting an input packet to the one or more processing operations. The region of the cache may further comprise a third set of one or more cache entries for storing packet metadata, e.g. in the form of a header.

Thus, in embodiments, storing data produced by the one or more processing operations in the local storage comprises storing primitive data produced by the one or more processing operations in the first set of cache entries of the region of the cache, and storing vertex data produced by the one or more processing operations in the second set of cache entries of the region of the cache.

In embodiments, a (each) packet processing unit processes an input packet by processing each primitive or group of primitives of the input packet in order (e.g. in which they are defined in the packet). Thus, in embodiments, processing the input packet to generate the output packet comprises, for each primitive or group of primitives of the input packet: subjecting the respective primitive or group of primitives to (the) one or more processing operations (e.g. comprising the culling operation and/or the compression operation), and storing data produced by the one or more processing operations in the local storage.

In embodiments, cache entries of the (region of the) cache are arranged in an order, and the output data produced for a (each) primitive or group of primitives is stored in the next cache entry (in the order) that has sufficient space available to store the data. Thus, in embodiment, cache entries are filled with output data in order as the data is produced by a packet processing unit (and when a cache entry is filled with output data, data is stored in a next cache entry (and so on)).

Thus, in embodiments, for a (each) primitive or group of primitives of an input packet, primitive data produced for the (respective) primitive or group of primitives is stored in a next available cache entry of the first set of cache entries of the region of the cache, and vertex data produced for the (respective) primitive or group of primitives is stored in a next available cache entry of the second set of cache entries of the region of the cache.

In embodiments, once processing of an input packet is completed (e.g. once all of the primitives or groups of primitives of a packet have been processed), the region of the cache may or may not be (completely) filled with output data, e.g. depending on a number of primitives that have survived the culling operation and/or depending on the degree of data compression achieved. Thus, once processing of an input packet is completed, the region of the cache may comprise one or more ("dirty") cache entries that are storing data produced by the input packet processing, and zero or more ("empty") cache entries that are not storing any data produced by the input packet processing.

In embodiments, memory allocation for storing the output packet data in memory is performed once processing of an input packet is completed, and is such that memory space is only allocated in respect of ("dirty") cache entries that are storing data produced by the input packet processing, and is not allocated in respect of ("empty") cache entries that are not storing any data produced by the input packet processing. This can allow efficient memory allocation.

To do this, in embodiments, once processing of an input packet is completed, each cache entry (in the region of the cache) that is storing data produced by the input packet processing is assigned a respective memory address (and each cache entry (in the region of the cache) that is not storing data produced by the input packet processing is not assigned a memory address).

In embodiments, the data produced by the input packet processing that is stored in a (each) cache entry is read and then written to the (respective) assigned memory address. For example, the data may be written directly to the assigned memory address in the memory, or the data may be written to a "normal" region of the cache and tagged with the assigned memory address (such that the data will be evicted to the assigned memory address in the memory as part of normal cache operation).

Alternatively, the address for a (each) cache entry that is storing data produced by the input packet processing may be changed to the (respective) assigned memory address. This may comprise re-configuring the cache entry to operate in the first (cache) mode of operation (such that the data will be evicted to the assigned memory address in the memory as part of normal cache operation).

Once an output packet has been written out to (stored in) the allocated memory space, the local storage (e.g. region of the cache) may be cleared and/or deallocated, and re-used for (temporarily) storing output data produced when processing a next input packet (and so on).

The technology described herein can be implemented in any suitable system, such as a suitably configured microprocessor based system. In embodiments, the technology described herein is implemented in a computer and/or micro-processor based system. The technology described herein is in embodiments implemented in a portable device, such as, and in embodiments, a mobile phone or tablet.

The technology described herein is applicable to any suitable form or configuration of graphics processor and graphics processing system, such as graphics processors (and systems) having a "pipelined" arrangement (in which case the graphics processor executes a rendering pipeline).

In embodiments, the various functions of the technology described herein are carried out on a single data processing platform that generates and outputs data, for example for a display device.

As will be appreciated by those skilled in the art, the graphics processing system may include, e.g., and in embodiments, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in embodiments does, also execute a driver for the processor and optionally a compiler or compilers for compiling (e.g. shader) programs to be executed by (e.g. an (programmable) processing unit of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The technology described herein can be used for all forms of input and/or output that a graphics processor may use or generate. For example, the graphics processor may execute a graphics processing pipeline that generates frames for display, render-to-texture outputs, etc. The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Embodiments of the technology described herein will now be described with reference to the drawings.

FIG. 1 shows an exemplary system on chip (SoC) graphics processing system 8 that comprises a host processor comprising a central processing unit (CPU) 1, a graphics processor (GPU) 2, a display processor 3, and a memory controller 5. As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiments, the graphics processor 2 executes a tile-based graphics processing pipeline that processes graphics primitives, such as triangles, when generating an output, such as an image for display.

Figure 2:
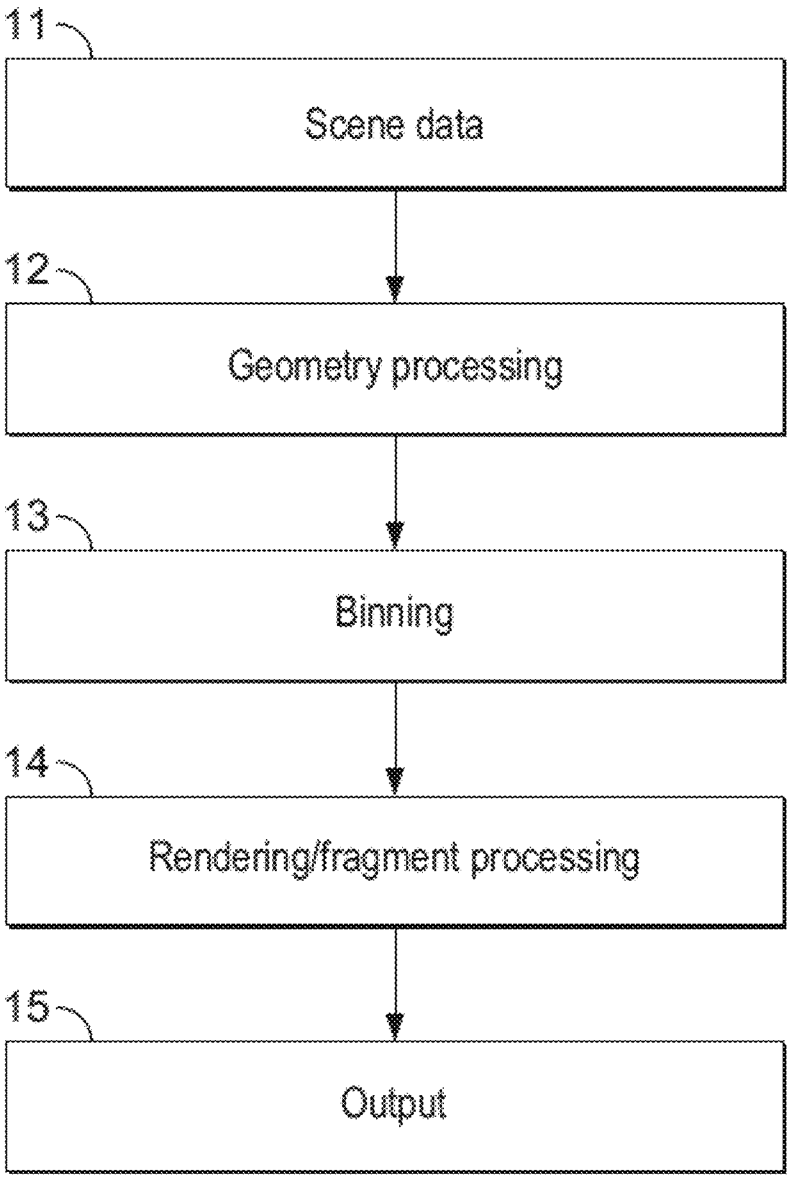
FIG. 2 shows an exemplary graphics processing pipeline.

FIG. 2 shows schematically the processing sequence of the tile-based graphics processing pipeline executed by the graphics processor 2 when generating an output in the present embodiments.

FIG. 2 shows the main elements and pipeline stages. As will be appreciated by those skilled in the art there may be other elements of the graphics processor and processing pipeline that are not illustrated in FIG. 2. It should also be noted here that FIG. 2 is only schematic, and that, for example, in practice the shown pipeline stages may share significant hardware circuits, even though they are shown schematically as separate stages in FIG. 2. It will also be appreciated that each of the stages, elements and units, etc., of the processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, when an output is to be generated, a set of scene data 11 is provided to the graphics processor 2 by the application 9 and/or driver 10, e.g. by storing the scene data 11 in the memory 6 from where it can then be read by the graphics processor 2. The scene data 11 may include at least a set of vertices, with each vertex having one or more attributes, such as positions, colours, etc., associated with it.

Then, geometry processing stage 12 performs geometry processing operations on the scene data 11. The geometry processing 12 may comprise performing vertex processing (vertex shading) of vertex attributes, such as vertex position shading to transform the positions for the vertices from the, e.g. "model" space in which they are initially defined, to the, e.g., "screen", space that the output is being generated in. The vertex shading may also comprise generating and/or processing other, non-position attributes of vertices. It would also be possible for some or all the non-position attribute shading to be deferred from the geometry processing stage 12 and, for example, to be triggered at the binning 13 or rendering 14 stages instead.

Once the desired geometry processing 12 has been performed, there is then, as shown in FIG. 2, a binning/tiling stage 13.

The graphics processor 2 in the present embodiments is a tile-based graphics processor and so generates respective output tiles of an overall output (e.g. frame) separately to each other, with the set of tiles for the overall output then being appropriately combined to provide the final, overall output. The binning process 13 operates to generate appropriate data structures for determining which primitives need to be processed for respective rendering tiles of the output being generated.

For example, the binning process 13 could sort the primitives into appropriate primitive lists, which indicate the primitives to be processed for respective tiles or sets of tiles. In the present embodiments, the binning process 13 generates hierarchies of bounding boxes, that can then be used at the rendering/fragment processing stage 14 to identify those primitives that need to be processed for a respective tile. This may be done substantially as described United Kingdom Patent Application No. 2316170.6.

In the present embodiments, the binning/tiling process 13 also culls primitives that are not visible (e.g. that fall outside the view frustum, and/or based on the facing direction of the primitives).

Once the binning/tiling process 13 has generated the necessary data structures for identifying the primitives to be processed for respective tiles of the render output, the primitives are then subjected to appropriate rendering/fragment processing 14. This operation is performed in the present embodiments on a tile-by-tile basis, using the data structures generated by the tiling/binning process 13 to identify those primitives that need to be processed for a respective tile.

The rendering/fragment processing 14 can comprise any suitable and desired rendering and fragment processing operations, such as first rasterising primitives to be processed for a tile to fragments, and then processing those fragments accordingly, e.g. by performing appropriate fragment shading of the fragments.

The output of the rendering/fragment processing 14 (the rendered fragments) is written to a tile buffer (not shown). Once the processing for the tile in question has been completed, then the tile will be written to an output data array in memory 6, and the next tile processed, and so on, until the complete output data array 15 has been generated. The process will then move on to the next output data array (e.g. frame), and so on.

The output data array may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

Figure 3:
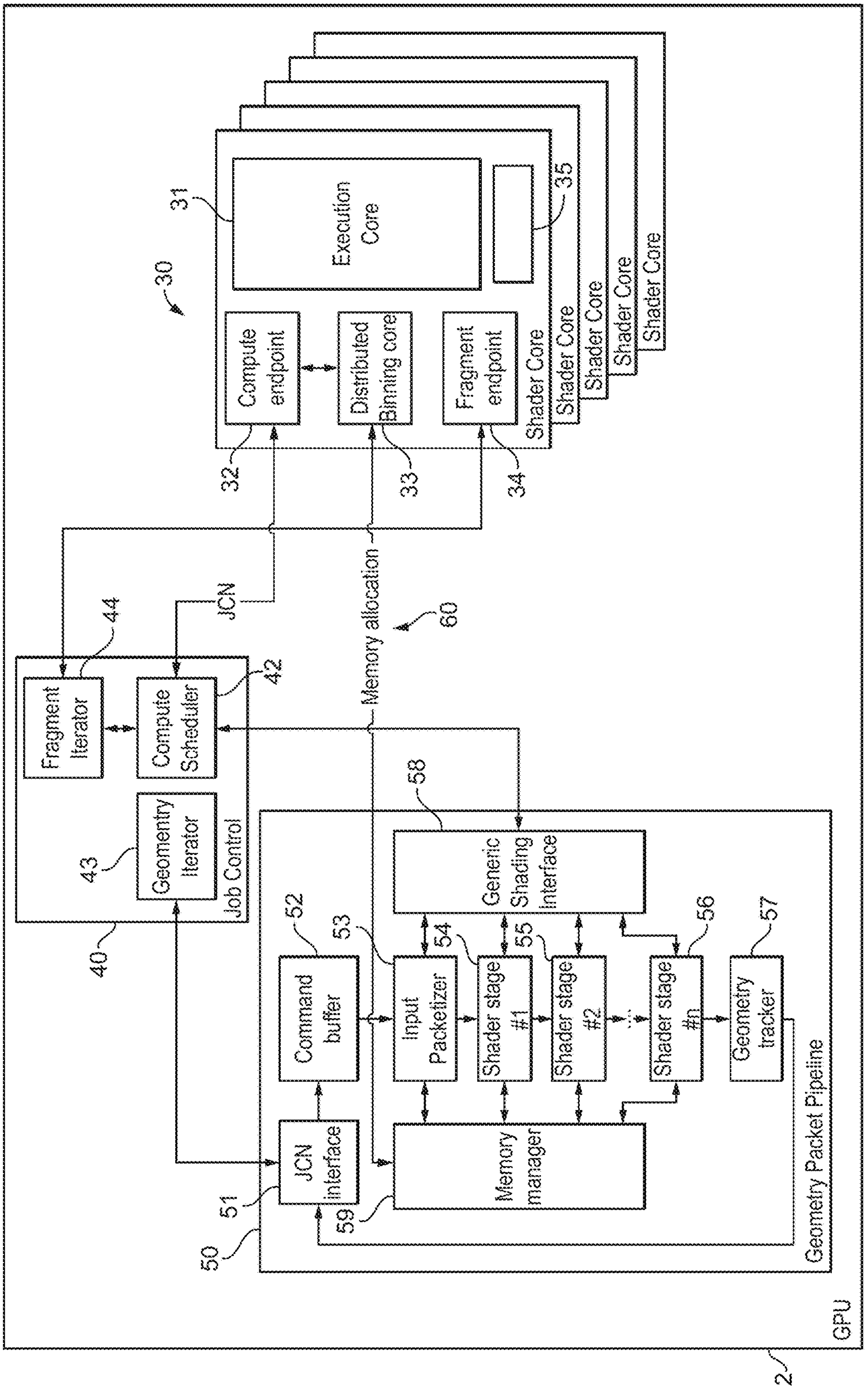
FIG. 3 shows schematically a graphics processor that may be operated in accordance with the technology described herein.

FIG. 3 shows an embodiment of a graphics processor (GPU) 2 that can execute a graphics processing pipeline of the form shown in FIG. 2, and that can be operated in the manner of the technology described herein.

As shown in FIG. 3, the graphics processor 2 comprises a plurality of processing (shader) cores 30 which are each operable to execute (shader) programs to perform processing operations. To facilitate this, each shader core 30 comprises a programmable execution unit (execution core) 31 that is operable to execute program instructions to perform processing operations.

In the present embodiments, the shader cores 30 are operable to execute both "compute" shader programs (to perform so-called compute shading) and fragment shader operations. To facilitate this, as shown in FIG. 3, each shader core 30 comprises a compute endpoint 32 and a fragment endpoint 34 that act as the control interface for performing compute shading and fragment processing, respectively, and that can trigger the execution core 31 to execute the appropriate compute shading or fragment shading tasks, as required.

As shown in FIG. 3, the compute endpoint 32 and fragment endpoint 34 receive appropriate processing tasks from a job control unit 40 of the graphics processor 2. The job control unit 40 includes a compute scheduler 42 and fragment iterator 44 for distributing processing jobs that the job controller 40 receives to the shader cores 30.

In the present embodiments, geometry processing 12 is performed by a geometry packet pipeline (geometry processing unit) 50 of the graphics processor 2, which operates to generate respective geometry packets containing geometry data.

As shown in FIG. 3, the geometry packet pipeline 50 is controlled by a geometry iterator 43 of the job control unit 40, which distributes the appropriate geometry processing jobs and tasks to the geometry packet pipeline 50. The geometry packet pipeline 50 has an appropriate interface 51 and command buffer 52 for receiving jobs and tasks from the geometry iterator 43 of the job control unit 40.

The geometry packet pipeline 50 is operable to trigger the performance of one or more "geometry" shader stages, which shader stages themselves will be executed by the shader cores 30, under the control of the geometry packet pipeline 50. To facilitate this, as shown in FIG. 3, the geometry packet pipeline 50 has an interface 58 to the compute scheduler 42 of the job control unit 40, via which it can control and trigger the performance of appropriate geometry shading operations by the shader cores 30.

As shown in FIG. 3, the geometry packet pipeline 50 comprises an input packetizer 53 that generates initial geometry packets storing data for sets of primitives to be processed for the render output being generated. To do this, the input packetizer 53 assembles primitives, and assigns the assembled primitives to packets in order. In the present embodiments, a packet has a fixed capacity, e.g. an upper limit of vertices and/or primitives, and when the fixed capacity is reached, a new packet is started. The packetizer 53 also allocates appropriate space in memory 6 for storing the geometry packets via memory manager 59. The packetizer 53 may also trigger position shading and vertex shading by the shader cores 30 in respect of geometry packets.

The geometry packet pipeline 50 also includes further shader stage circuits 54, 55, 56 that are operable to trigger compute shaders for performing geometry processing in respect of the geometry packets, such as task shaders, mesh shaders, tessellation shaders, etc., (which again will be executed by the shader cores 30). The geometry packet pipeline 50 further includes a geometry tracker 57 that keeps track of completed geometry packets.

In the present embodiments, as shown in FIG. 3, each shader core 30 includes a distributed binning core (packet processing unit) 33 that is operable to perform the binning/tiling process 13. The distributed binning cores 33 process the geometry packets (input packets) generated by the geometry packet pipeline 50 to generate corresponding primitive packets (output packets) and data that can be used to determine which of the primitives need to be processed for respective rendering tiles of the output being generated.

In the present embodiments, the distributed binning cores 33 generate hierarchies of bounding boxes for primitives and primitive packets (that contain primitives to be rendered), which are then used at the rendering/fragment processing stage 14 to identify those primitives that need to be processed for a respective tile. The distributed binning cores 33 also cull primitives that are not visible (e.g. that fall outside the view frustum, and/or based on the facing direction of the primitives).

The primitive packets generated by the distributed binning cores 33 are output to memory 6 via the graphics processor cache system. In the present embodiments, as shown in FIG. 3, each shader core 30 includes a respective L1 cache (load/store cache ("LSC")) 35 of the cache system, and the graphics processor 2 further includes a shared L2 cache that is in communication with each of the shader cores 30 and the memory 6 (not shown in FIG. 3). As shown in FIG. 3, the distributed binning cores 33 also have an interface 60 to the memory manager 59 to allow the appropriate space in memory 6 to be allocated for storing the output primitive packets.

In the present embodiments, the rendering/fragment processing 14 is performed by executing fragment processing operations on the shader cores 30 under the control of the fragment endpoint 34. To facilitate this, the fragment endpoint 34 of each shader core is operable to trigger appropriate fragment shader operation by a shader core.

Thus, in operation of the present embodiments, the geometry packet pipeline 50 performs geometry processing 12 to generate geometry packets, the distributed binning cores 33 perform binning/tiling processing 13 to generate primitive packets from the geometry packets, and the shader cores 30 perform rendering/fragment processing 14 using the primitive packets.

Figure 4:
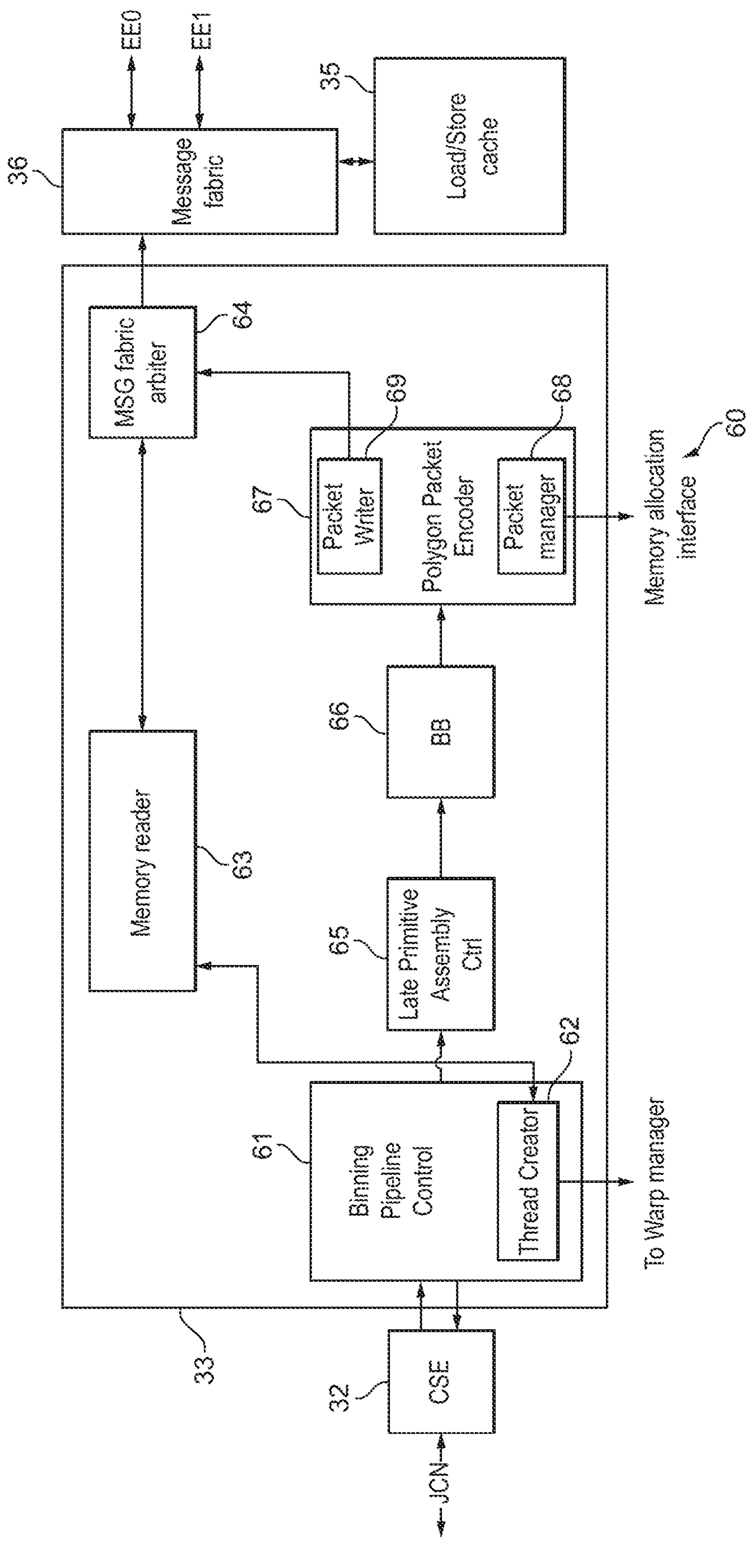
FIG. 4 shows schematically a distributed binning core of the graphics processor of FIG. 3.

FIG. 4 shows a distributed binning core 33 of a shader core 30 in more detail according to the present embodiments. As shown in FIG. 4, the distributed binning core 33 has a control unit 61 that receives packet shading and binning requests from the compute endpoint 32 of the shader core 30. In response to receiving such requests, a thread creator 62 of the control unit 61 may trigger appropriate shading operations by the execution core 31 of the shader core 30, such as non-position attribute shading (e.g. where non-position attribute shading was not performed by the input packetizer as part of the input packetizer 53 operation), with memory reader 63 fetching the appropriate geometry packet to be shaded from memory 6. As illustrated in FIG. 4, memory reader 63 has access to memory 6 via message fabric 64, 36 and load/store cache (LSC) 35.

Once the shading operations for a geometry packet have been completed, late primitive assembly unit 65 may assemble and associate primitives and shaded vertex data, and then bounding box generation unit 66 uses the data to generate bounding boxes for the primitives of the packet.

In the present embodiments, bounding box generation unit 66 also operates to cull primitives from further processing on the basis of their (potential) visibility. This culling may comprise, for example, front/back-face culling, frustum culling, and/or sample aware culling, etc.

Primitive packet encoder 67 then operates to compress the packet data and write out a (compressed) primitive packet to memory 6. To do this, as shown in FIG. 4, packet manager 68 may allocate the required memory space using interface 60, and packet writer 69 may write out the data to the allocated space in memory 6 via message fabric 64, 36 and load/store cache 35.

The inventors have recognised that the amount of data in a primitive packet generated and written out by a distributed binning core 33 can vary depending on the results of the culling operation performed by the bounding box generation unit 66 and depending on the degree of compression performed by the primitive packet encoder 67. For example, if all of the primitives defined by an input geometry packet survive the culling operation, then the corresponding output primitive packet will contain data for all of those primitives, whereas if some of the primitives are culled by the culling operation, then the corresponding output primitive packet will contain data for fewer surviving primitives. Similarly, the size of an output primitive packet may depend on the degree of compressibility of the data.

One way to handle this variability would be for packet manager 68 to allocate space in memory 6 to store data for a "worst case" output packet, e.g. comprising the maximum possible number of output primitives in a packet. The inventors have recognised, however, that this may not be memory efficient.

An improved way to handle primitive packet size variability is for a distributed binning core 33 to temporarily buffer the output data it is generating for a primitive packet, and to only perform memory allocation (and write out of the data) for the output primitive packet once the total amount of output data for the primitive packet is known. The inventors have found that this can improve memory efficiency. However, this may require that each distributed binning core 33 has a relatively large buffer capacity, which can increase (silicon) area costs for the distributed binning cores 33.

In embodiments of the technology described herein, a region of the load/store cache 35 of a shader core 30 can be allocated for use as a scratchpad that a distributed binning core 33 can use to temporarily store output data it is generating for a primitive packet.

Figure 5:
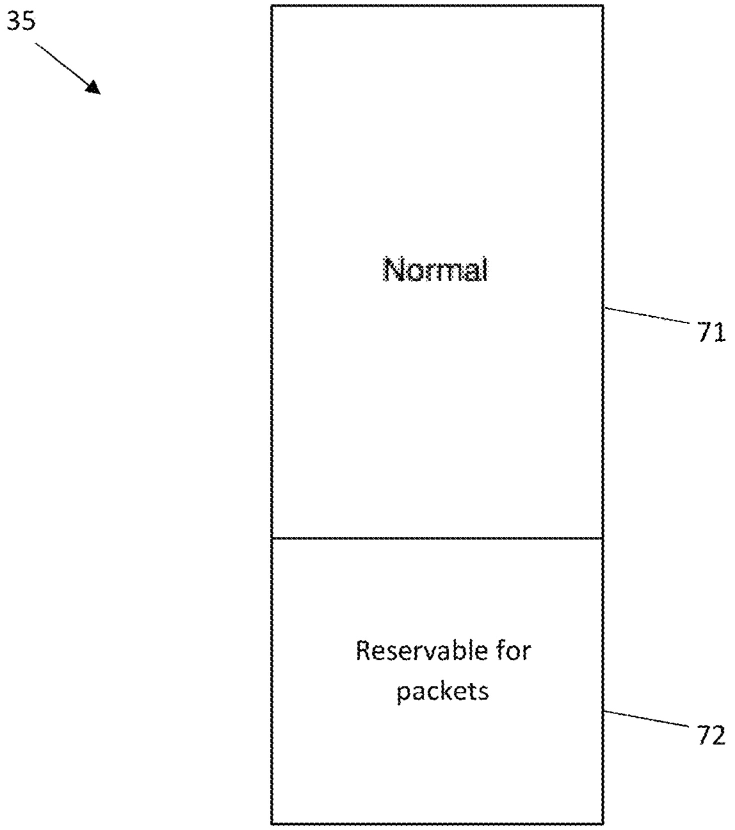
FIG. 5 shows schematically a load/store cache of the graphics processor of FIG. 3.

This is illustrated by FIG. 5. As shown in FIG. 5, in embodiments of the technology described herein, the load/store cache 35 of a (each) shader core 30 is divided into a first region 71 that (e.g. always) operates in the normal manner for a cache, and a second region 72 that can be selectively configured to operate either in the normal manner for a cache, or as a temporary scratchpad. When operating as a scratchpad, a (each) cache line of the second region 72 effectively does not form part of the cache system, and so cannot for example be written to or evicted as part of normal cache operation.

In operation of embodiments of the technology described herein, when processing a packet, a distributed binning core 33 temporarily buffers output data it is generating for the packet in the scratchpad region 72 of its associated load/store cache 35. Then, when processing of the packet is complete, and the total amount of output data for the primitive packet is known, memory allocation (and write out of the data) is performed.

This can improve memory efficiency by allowing only the memory space that is actually required to store an output primitive packet to be allocated in memory 6. Furthermore, using the load/store cache 35 as the scratchpad can reduce (silicon) area requirements, e.g. as compared to providing a dedicated local buffer.

Figure 6:
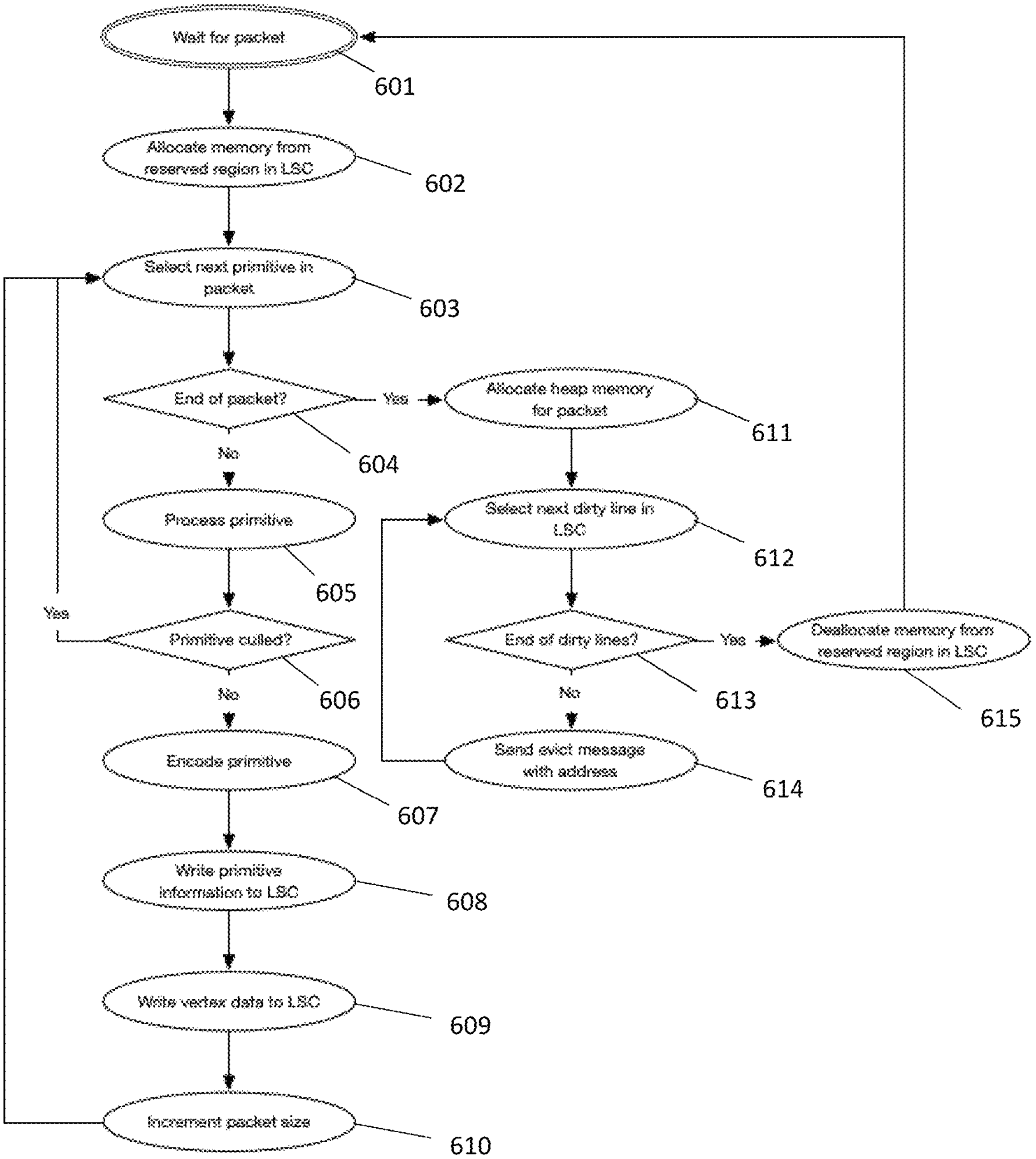
FIG. 6 is a flowchart illustrating a process for operating the graphics processor of FIG. 3 in accordance with embodiments of the technology described herein.

FIG. 6 illustrates a process in accordance with embodiments of the technology described herein. As shown in FIG. 6, when a distributed binning core 33 receives a request to process a geometry packet from compute endpoint 32 (step 601), control unit 61 may trigger packet shading and allocate space of the scratchpad region 72 of the corresponding load/store cache 35 for temporarily storing output primitive packet data (step 602). In the present embodiments, sufficient space is allocated in the scratchpad region 72 to store output primitive packet data for a "worst case" packet, e.g. comprising all of the primitives in the packet.

Figure 7A:
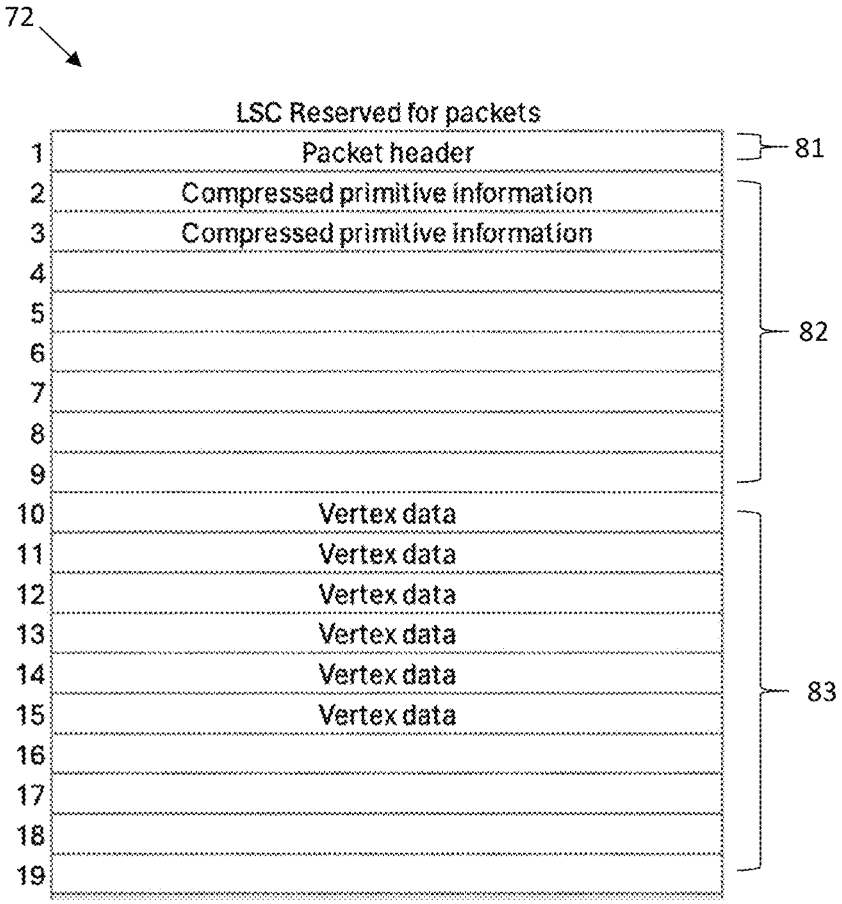

FIG. 7A illustrates an example allocation in the scratchpad region 72 of the load/store cache 35 in which a "worst case" packet can be stored in one cache line storing a packet header, eight cache lines storing primitive information, and ten cache lines storing vertex data. As illustrated in FIG. 7A, in this example, a first region 81 of the scratchpad 72 comprising one cache line is allocated for storing a packet header, a second region 82 of the scratchpad 72 comprising eight cache lines is allocated for storing primitive information, and a third region 83 of the scratchpad 72 comprising ten cache lines is allocated for storing vertex data. Other arrangements are possible.

Returning to FIG. 6, once any shading is complete, late primitive assembly unit 65 assembles a primitive in the packet (step 603), and bounding box generation unit 66 processes the assembled primitive (step 605).

If the primitive survives culling by the bounding box generation unit 66 (at step 606), primitive packet encoder 67 encodes primitive and vertex data for the primitive (step 607), and packet writer 69 writes the encoded primitive information to the allocated primitive information region 82 of the scratchpad 72 (step 608), writes the encoded vertex data to the allocated vertex data region 83 of the scratchpad 72 (step 609), and updates the packet header in the allocated header region 81 of the scratchpad 72 (step 610).

As illustrated in FIG. 6, each primitive in the packet is processed in turn in this manner. Alternatively, the primitives in a packet may be grouped into one or more groups of plural primitives, and groups of primitives in a packet may be processed in turn.

FIG. 7A illustrates an example of the scratchpad region 72 after the processing of a packet has been completed. In this example, some of the primitives in the packet did not survive culling by the bounding box generation unit 66, and thus not all of the space allocated in the scratchpad region 72 has been used to store the output primitive packet. The output primitive packet is thus stored "sparsely" in the scratchpad region 72, with gaps of "unused" caches lines appearing in data regions 82, 83 of the scratchpad 72.

Returning to FIG. 6, once all of the primitives of a packet have been processed (at step 604), space in memory 6 for storing the packet is allocated by packet manager 68 (step 611). In the present embodiments, packet manager 68 only allocates space in memory 6 corresponding to used cache lines (but not unused cache lines). Thus, packet manager 68 only allocates sufficient space in memory 6 to store the output primitive packet "compactly" in memory 6 (but e.g. not sufficient to store the output primitive packet "sparsely").

This is illustrated by FIG. 7B. FIG. 7B shows the same packet temporarily stored in the scratchpad region 72 of the load/store cache 35 as FIG. 7A. As illustrated by FIG. 7B, the memory allocation (at step 611) is such that only those cache lines in the scratchpad region 72 that have been written to (i.e. used) are assigned a memory address 84.

Returning to FIG. 6, once memory allocation for a packet has been performed (at step 611), each cache line in the scratchpad region 72 that is storing data for the packet (that is used) is evicted to the assigned address in memory 6 (steps 612-614). This may involve reading a (each) used cache line from the scratchpad region 72, and writing the cache line to "normal" cache e.g. the normal region 71 of the load/store cache 35, with the written cache line being tagged in normal cache with the assigned memory address. Alternatively, the address/tag of a (each) used cache line in the scratchpad region 72 may be changed to the assigned memory address. Other arrangements are possible.

Figure 7C:
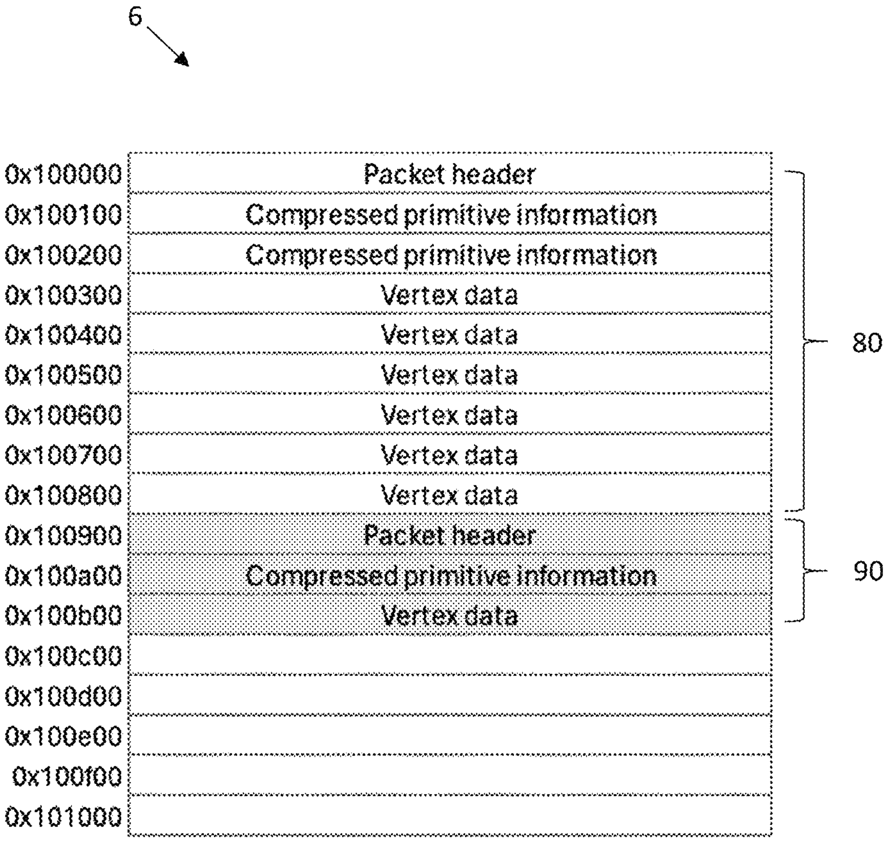

The result of this is illustrated by FIG. 7C. FIG. 7C shows the same packet as FIGS. 7A and 7B after having been evicted to memory 6. As illustrated by FIG. 7C, this output primitive packet 80 is now stored compactly in the memory 6 (i.e. without the "empty" space). FIG. 7C also illustrates a second primitive packet 90 stored compactly in the memory 6 following the first primitive packet 80.

Returning to FIG. 6, once all of the data for a packet has been evicted to memory 6 (at step 613), the space allocated in the scratchpad region 72 for the packet is deallocated (step 615), e.g. and then used for the next packet, and so on.

This can significantly reduce the memory footprint associated with generating and storing output primitive packets.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processor that comprises:

local storage; and one or more packet processing units operable to process input packets of primitives to generate output packets of primitives, and store output packets of primitives in memory;

the method comprising a packet processing unit of the one or more packet processing units:

processing an input packet to generate an output packet; and storing the output packet in memory;

wherein processing the input packet to generate the output packet comprises:

subjecting the input packet to one or more processing operations; and storing data produced by subjecting the input packet to the one or more processing operations in a region of the local storage that is able to store a maximum possible amount of data that can be produced by subjecting the input packet to the one or more processing operations; and wherein storing the output packet in memory comprises:

allocating an amount of memory space for storing the output packet based on an amount of data produced by subjecting the input packet to the one or more processing operations that is stored in the region of the local storage; and storing the data produced by subjecting the input packet to the one or more processing operations in the allocated memory space.

2. The method of claim 1, wherein the one or more processing operations comprise a culling operation and/or a compression operation.

3. The method of claim 1, wherein the graphics processor comprises a cache system, and the local storage is a cache of the cache system.

4. The method of claim 3, wherein the region is a region of the cache that is selectively configurable to operate in a first mode of operation in which data stored in the region can be evicted to memory and a second mode of operation in which data stored in the region cannot be evicted to memory; and wherein:

storing data produced by subjecting the input packet to the one or more processing operations in the region of the local storage comprises:

configuring the region of the cache to operate in the second mode of operation; and storing the data produced by subjecting the input packet to the one or more processing operations in the region of the cache.

5. The method of claim 3, wherein allocating an amount of memory space for storing the output packet based on an amount of data produced by subjecting the input packet to the one or more processing operations that is stored in the region of the local storage comprises:

allocating memory space for storing each cache entry of the cache that data produced by subjecting the input packet to the one or more processing operations is stored in.

6. The method of claim 3, wherein storing the data produced by subjecting the input packet to the one or more processing operations in memory comprises, for each cache entry of the cache that data produced by subjecting the input packet to the one or more processing operations is stored in:

assigning a memory address to the respective cache entry;

reading the data stored in the respective cache entry; and writing the read data to the assigned memory address.

7. The method of claim 3, wherein storing the data produced by subjecting the input packet to the one or more processing operations in memory comprises, for each cache entry of the cache that data produced by subjecting the input packet to the one or more processing operations is stored in:

assigning a memory address to the respective cache entry; and changing an address for the respective cache entry to the assigned memory address.

8. A non-transitory computer readable storage medium storing software code which when executing on a processor performs the method of claim 1.

9. A graphics processor comprising:

local storage; and one or more packet processing units operable to process input packets of primitives to generate output packets of primitives, and store output packets of primitives in memory;

wherein a packet processing unit of the one or more packet processing units is configured to process an input packet to generate an output packet by:

subjecting the input packet to one or more processing operations; and storing data produced by subjecting the input packet to the one or more processing operations in a region of the local storage that is able to store a maximum possible amount of data that can be produced by subjecting the input packet to the one or more processing operations; and wherein the packet processing unit is configured to store the output packet in memory by:

allocating an amount of memory space for storing the output packet based on an amount of data produced by subjecting the input packet to the one or more processing operations that is stored in the region of the local storage; and storing the data produced by subjecting the input packet to the one or more processing operations in the allocated memory space.

10. The graphics processor of claim 9, wherein the one or more processing operations comprise a culling operation and/or a compression operation.

11. The graphics processor of claim 9, wherein the graphics processor comprises a cache system, and the local storage is a cache of the cache system.

12. The graphics processor of claim 11, wherein the region is a region of the cache that is selectively configurable to operate in a first mode of operation in which data stored in the region can be evicted to memory and a second mode of operation in which data stored in the region cannot be evicted to memory; and the packet processing unit is configured to store data produced by subjecting the input packet to the one or more processing operations in the region of the cache by:

configuring the region of the cache to operate in the second mode of operation; and storing the data produced by subjecting the input packet to the one or more processing operations in the region of the cache.

13. The graphics processor of claim 11, wherein the packet processing unit is configured to allocate an amount of memory space for storing the output packet based on an amount of data produced by subjecting the input packet to the one or more processing operations that is stored in the region of the local storage by:

allocating memory space for storing each cache entry of the cache that data produced by subjecting the input packet to the one or more processing operations is stored in.

14. The graphics processor of claim 11, wherein the packet processing unit is configured to store the data produced by subjecting the input packet to the one or more processing operations in memory by, for each cache entry of the cache that data produced by subjecting the input packet to the one or more processing operations is stored in:

assigning a memory address to the respective cache entry;

reading the data stored in the respective cache entry; and writing the read data to the assigned memory address.

15. The graphics processor of claim 11, wherein the packet processing unit is configured to store the data produced by subjecting the input packet to the one or more processing operations in memory by, for each cache entry of the cache that data produced by subjecting the input packet to the one or more processing operations is stored in:

assigning a memory address to the respective cache entry; and changing an address for the respective cache entry to the assigned memory address.

* * * * *